United States Patent
Yamada

(10) Patent No.: US 7,321,452 B2
(45) Date of Patent: Jan. 22, 2008

(54) IMAGE PROCESSING APPARATUS

(75) Inventor: Hideaki Yamada, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 928 days.

(21) Appl. No.: 10/396,324

(22) Filed: Mar. 26, 2003

(65) Prior Publication Data

US 2003/0215158 A1 Nov. 20, 2003

(30) Foreign Application Priority Data

Mar. 26, 2002 (JP) ............................ P2002-085629

(51) Int. Cl.
*H04N 1/04* (2006.01)
(52) U.S. Cl. ...................... 358/474; 358/473; 358/501; 358/1.15; 358/1.12; 358/451; 382/298; 382/112; 382/299
(58) Field of Classification Search ................ 358/474, 358/501, 473, 1.15, 462, 1.2, 451; 382/298, 382/112, 299
See application file for complete search history.

(56) References Cited

U.S. PATENT DOCUMENTS 5,764,611 A * 6/1998 Watanabe ................... 386/113
6,011,878 A * 1/2000 Ushida et al. ............... 382/298
6,271,933 B1 * 8/2001 Asai et al. .................... 358/1.2
6,591,396 B1 * 7/2003 Honda ......................... 714/798
6,898,329 B1 * 5/2005 Takahashi ................... 382/272
6,930,808 B2 * 8/2005 Otani ........................... 358/515
2003/0176768 A1 * 9/2003 Gono et al. ................. 600/109

FOREIGN PATENT DOCUMENTS

JP 2001-186362 A 7/2001

* cited by examiner

*Primary Examiner*—Douglas Q. Tran
*Assistant Examiner*—Negussie Worku
(74) *Attorney, Agent, or Firm*—Birch, Stewart, Kolasch & Birch, LLP

(57) ABSTRACT

An object of the invention is to enable appropriate interpolation even in a halftone image binarized by error diffusion or the like. While image reading signals from a hand scanner are inputted to an A/D conversion section and converted to multivalued digital signals, the presence or absence of a skip is detected by a skip acknowledgement section, and when a skip is detected, a selector is switched toward a multivalued image line buffer. Multivalued image data of one line is stored in the multivalued image line buffer, and interpolation processing is carried out in a binarization processing section by the use of the stored multivalued image data of one line. When a skip is not detected, the multivalued image data from the A/D conversion section is passed by the selector to the binarization processing section and binarized.

5 Claims, 4 Drawing Sheets

SKIPPED LINE

NO INTERPOLATION

INTERPOLATION
IN PRIOR ART

INTERPOLATION
IN INVENTION

IMAGE PROCESSING APPARATUS

BACKGROUND OF THE INVENTION

1. Field of the Invention

The invention relates to an image processing apparatus which is capable of carrying out interpolation processing of an image, for example, when a monochrome hand scanner skips reading.

2. Description of the Related Art

Traditionally, a scanner used in a facsimile and a copier is provided with image sensors such as CCDs or CMOSs placed in one line, thereby reading images on a document at individual lines sequentially while relatively moving the location of the document in a sub-scanning direction perpendicular to a main scanning direction, which is the direction of the lines, and forming digital data of a two-dimensional image. In contrast to a camera using a two-dimensional image sensor, a scanner uses a one-dimensional image sensor.

Methods for moving the relative location of an image sensor and a document are a flat bed scanner method of fixing a document and moving an image sensor and a sheet feed scanner method of fixing an image sensor and moving a document. Since both the methods need mechanisms for moving, a scanner becomes large and hard to move.

On the other hand, there is a scanner moved not mechanically but manually. This is called a hand scanner. Although a hand scanner is easily portable, it is difficult to keep a speed of manually moving the scanner constant. Therefore, there arises a case where the moving speed becomes higher than a speed at which the scanner is capable of reading and reading of a line is skipped.

When reading of a line is skipped, a read image is shrunk as compared with original one. In order to prevent shrinkage, there is a need to carry out interpolation processing. In the monochrome hand scanner, in order to save a memory capacity, an image is usually stored after being binarized. Therefore, for interpolation, a method of copying a previously read and binarized line to a skipped line is used.

When interpolation is carried out by the method of copying a binarized line, an image quality does not deteriorate extremely in the case of a character image for which simple binarization is used. However, when interpolation is carried out in the case of a halftone image by error diffusion or the like, an image quality deteriorates considerably because a thick cluster of black pixels of two lines is formed only at an interpolated part. The deterioration state of the image quality is apparent by comparing FIG. 4A and FIG. 4B. Therefore, interpolation is carried out only in a case where the subject is a character image, and not carried out in the case of a halftone image.

SUMMARY OF THE INVENTION

An object of the invention is to provide an image processing apparatus which is capable of appropriate interpolation even in the case of a halftone image binarized by error diffusion or the like.

The invention provides an image processing apparatus which carries out the processing of generating, from analog image signals inputted for individual lines in a main scanning direction, binary image data in which the lines are sequentially arranged in a sub-scanning direction, comprising:

analog/digital conversion means for converting analog image signals to a plurality of predetermined bits of multivalued digital signals;

multivalued image storing means for storing image data of one line represented by multivalued digital signals obtained by conversion of analog image signals of one line by the analog/digital conversion means; and binarization processing means which is capable of binarization processing of image data of one line obtained from the analog/digital conversion means and interpolation processing between lines to be binarized by the use of image data of one line stored in the multivalued image storing means.

According to the invention, the image processing apparatus comprises the analog/digital conversion means, the multivalued image storing means, and the binarization processing means in order to carry out the processing of generating, from analog image signals inputted for individual lines in the main scanning direction, binary image data in which the lines are sequentially arranged in the sub-scanning direction. The analog/digital conversion means converts inputted analog image signals to a plurality of predetermined bits of multivalued digital signals. The multivalued image storing means stores image data of one line represented by multivalued digital signals obtained by conversion of analog image signals of one line by the analog/digital conversion means. The binarization processing means is capable of binarization processing of image data of one line obtained from the analog/digital conversion means and interpolation processing between lines to be binarized by the use of image data of one line stored in the multivalued image storing means. By alternately carrying out binarization processing by the use of error diffusion or organizational dither and interpolation processing, it is possible to increase resolution in the sub-scanning direction. Since the multivalued storing means is just required to store image data of one line, it is possible to make necessary storage capacity comparatively small.

According to the invention, by storing multivalued image data of only one line, it is possible to carry out the interpolation processing between lines to be binarized, and it is possible to increase resolution in the sub-scanning direction by alternately carrying out binarization and interpolation. Since it is just required to store multivalued image data of one line, it is possible to make necessary storage capacity comparatively small.

Further, in the invention, it is preferable that the analog image signals are image reading signals inputted by a hand scanner, and the image processing apparatus further comprises skip detection means for detecting presence or absence of a skip, which is to skip reading of a line, from the image reading signals, wherein the binarization processing means carries out the binarization processing in a line in which a skip is not detected by the skip detection means and carries out the interpolation processing in a line in which a skip is detected.

According to the invention, when image reading signals inputted by the hand scanner are inputted as the analog image signals, and the skip detection means detects a skip, which is to skip reading of a line, the binarization processing means carries out the interpolation processing in a line in which a skip is detected, so that it is possible to control deterioration of an image quality due to a skip.

Further, according to the invention, even in a case where a skip, which is to skip reading of a line, is detected in image reading signals inputted by the hand scanner, it is possible to control an influence of a skip on deterioration of an image quality because the interpolation processing is carried out in a line in which a skip is detected.

Still further, in the invention, it is preferable that the binarization processing means is capable of carrying out the interpolation processing by switching a plurality of methods including fixed threshold value binarization and error diffusion binarization, and the image processing apparatus further comprises key operation inputting means for switching between a character mode and a photo mode, wherein when the key operation inputting means is switched to the character mode, the binarization processing means carries out the interpolation processing by fixed threshold value binarization.

According to the invention, the binarization processing means carries out the interpolation processing by fixed threshold value binarization when the key operation inputting means is switched to the character mode, and the binarization processing means carries out the interpolation processing by error diffusion binarization when the key operation inputting means is switched to the photo mode, so that it is possible to switch the interpolation processing methods so as to be appropriate for an image such as a character whose gradation is slight and whose outline is clear-cut and an image such as a photo which is multi-gradation and has a lot of halftones, respectively.

Further, according to the invention, even though reading is skipped and interpolated in the case of binarizing a photo image by error diffusion and taking in, it is possible to carry out the interpolation processing without impairing an image quality.

The invention provides an image processing method comprising the steps of:

inputting analog image signals of one line in a main scanning direction;

converting the inputted analog image signals to a plurality of predetermined bits of multivalued digital signals by analog/digital conversion means;

storing image data of one line represented by multivalued digital signals obtained by conversion of the analog image signals of one line by the analog/digital conversion means in multivalued image storing means;

detecting presence or absence of a skip in which reading a line is skipped, by skip detection means;

when a skip is not detected in the line, outputting the multivalued digital signals converted by the analog/digital conversion means to binarization processing means, and when a skip is detected in the line, outputting the image data represented by the multivalued digital signals stored in the multivalued image storing means, to the binarization processing means; and in the binarization processing means, when a skip is not detected in the line, carrying out binarization processing of the multivalued digital signals, and when a skip is detected in the line, carrying out binarization processing of the image data from the multivalued image storing means together with interpolation processing thereof.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
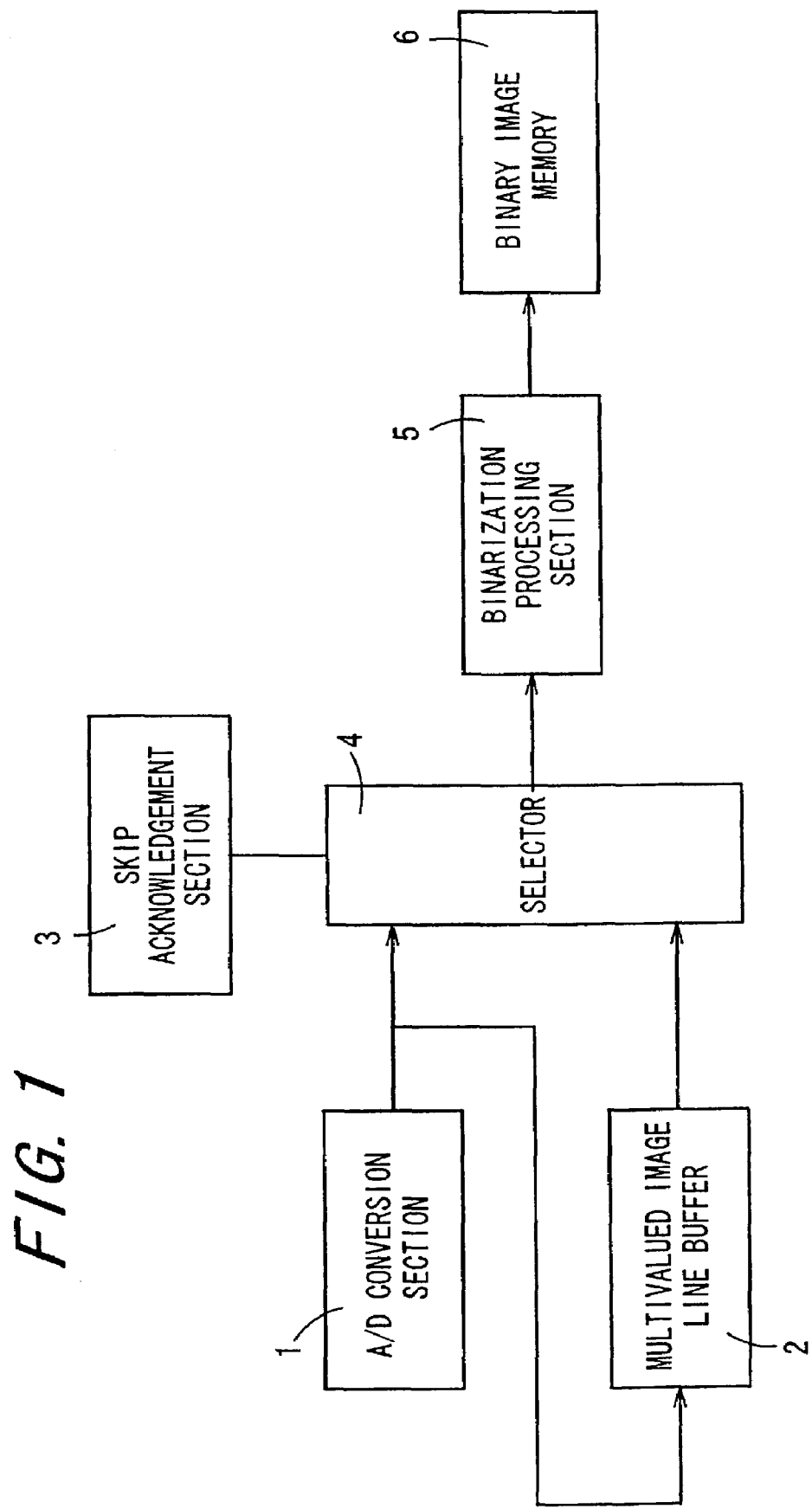
FIG. 1 is a block diagram showing a schematic electrical construction of a hand scanner image processing apparatus, which is an embodiment of the invention.

Now referring to the drawings, preferred embodiments of the invention are described below.

A hand scanner image processing apparatus of the invention will be described below in detail based on the drawings.

FIG. 1 shows a schematic electrical construction of a hand scanner image processing apparatus, which is an embodiment of the invention. The hand scanner image processing apparatus comprises an analog/digital conversion section (hereinafter called an A/D conversion section) 1, a multivalued image line buffer 2, a skip acknowledgment section 3, a selector 4, a binarization processing section 5, and a binary image memory 6.

The A/D conversion section 1 functions as analog/digital conversion means for converting analog signals corresponding to individual pixels of an image inputted by a hand scanner to multivalued digital signals. The multivalued image line buffer 2 functions as multivalued image storing means for storing multivalued image data of one line represented by multivalued digital signals outputted from the A/D conversion section 1. The skip acknowledgement section 3 functions as skip detection means for detecting whether reading is carried out by the hand scanner and acknowledges a detection result. The selector 4 selects either a value outputted from the A/D conversion section 1 or a value outputted from the multivalued image line buffer 2 based on a value outputted by the skip acknowledgement section 3. The binarization processing section 5 binarizes multivalued image data selected and outputted by the selector 4 by an error diffusion method or the like. The selector 4 and the binarization processing section function as binarization processing means. The binary image memory 6 stores binary image data outputted from the binarization processing section 5.

In the embodiment, other than the binary image memory 6 for storing a binary image, in the form of the multivalued image line buffer 2, a buffer for a multivalued image is prepared only for one line. Reading of an image is carried out at each line. After reading the image of one line is completed, multivalued image data converted from analog to digital and formed in the A/D conversion section 1 is stored in the multivalued image line buffer 2 in the state of being multivalued in parallel with being binarized. On this occasion, reading is not skipped, and the selector 4 selects output from the A/D conversion section 1. In the embodiment, the A/D conversion section 1 carries out conversion to, for example, 8 bits of digital data.

When reading is skipped and interpolation is carried out, multivalued image data of one line stored in the multivalued image line buffer 2 is selected by the selector 4, binarized by the binarization processing section 5 and, instead of a part having not been read, made to be part of a binary image stored in the binary image memory 6.

More specifically, in the embodiment, analog image signals inputted to the A/D conversion section 1 are image reading signals inputted by the hand scanner, and the skip acknowledgement section 3 detects the presence or absence of a skip, which is to skip reading of a line, from image reading signals. The selector 4 serving as binarization processing means, in a case where a skip is not detected in a line by the skip acknowledgement section 3, selects output from the A/D conversion section 1, passes to the binarization processing section 5 to carry out the binarization processing, and in a case where a skip is detected in a line, passes output from the multivalued image line buffer 2 to the binarization processing section 5 to carry out interpolation processing. When image reading signals inputted by the hand scanner are inputted as analog signals and the skip acknowledgement section 3 serving as the skip detection means detects a skip, which is to skip reading of a line, the binarization processing section 5 serving as the binarization processing means carries out the interpolation processing in a line in which a skip is detected, so that it is possible to control deterioration of an image quality.

Although a method for binarization may be any of an error diffusion method, an organizational dither method, and fixed threshold value binarization, it is desirable that the error diffusion method or the organizational dither method is selected when the subject of an inputted image is a photo image and generation of a halftone image is desired. When an inputted image is a character image, it is desirable that the fixed threshold value binarization is selected. In the case of applying the invention to a character image as well, the image quality of a generated binary image is no better than that by the conventional method of interpolating after binarizing, whereas there is a merit that it is possible to share the processing and a circuit of a halftone image.

Figure 2:
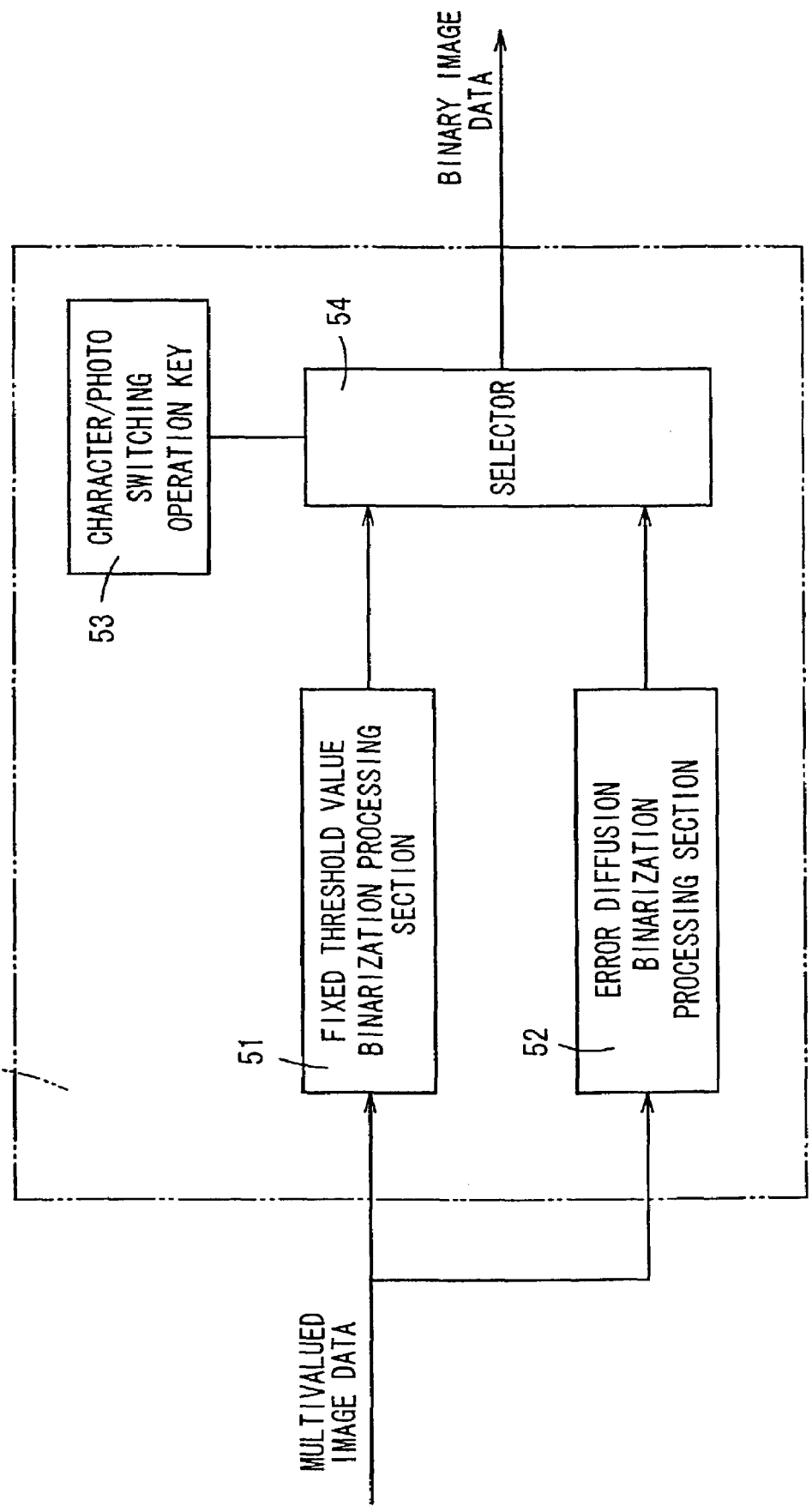
FIG. 2 is a block diagram showing a schematic electrical construction of a binarization processing section of FIG. 1.

FIG. 2 shows a schematic electrical construction which enables the binarization processing section 5 of FIG. 1 to switch interpolation methods for binarization in the cases of a character image and a photo image. The binarization processing section 5 includes a fixed threshold value binarization processing section 51, an error diffusion binarization processing section 52, a character/photo operation key 53, and a selector 54. Multivalued image data is inputted to both the fixed threshold value binarization processing section 51 and the error diffusion binarization processing section 52, binarized by fixed threshold value binarization and error diffusion binarization, respectively, and outputted. After that, binarized data selected by the character/photo switching operation key 53 is outputted from the selector 54.

More specifically, in the embodiment, the binarization processing section 5 is capable of switching a plurality of methods including fixed threshold value binarization and error diffusion binarization to carry out the interpolation processing, and includes the character/photo operation key 53 as key operation input means for switching between a character mode and a photo mode. The binarization processing section 5 carries out the interpolation processing in the fixed threshold value binarization processing section 51 when the character/photo operation key 53 is switched to the character mode, and carries out the interpolation processing in the error diffusion binarization processing section 52 when the character/photo operation key 53 is switched to the photo mode. Thus, it is possible to switch interpolation methods appropriate for an image such as a character whose gradation is slight and whose outline is clear-cut and an image such as a photo which is multi-gradation and has a lot of halftones, respectively. Here, in the case of applying the scanner image processing apparatus only to a photo image, it is just required to construct so that the binarization processing section 5 directly carries out only error diffusion binarization.

Figure 3:
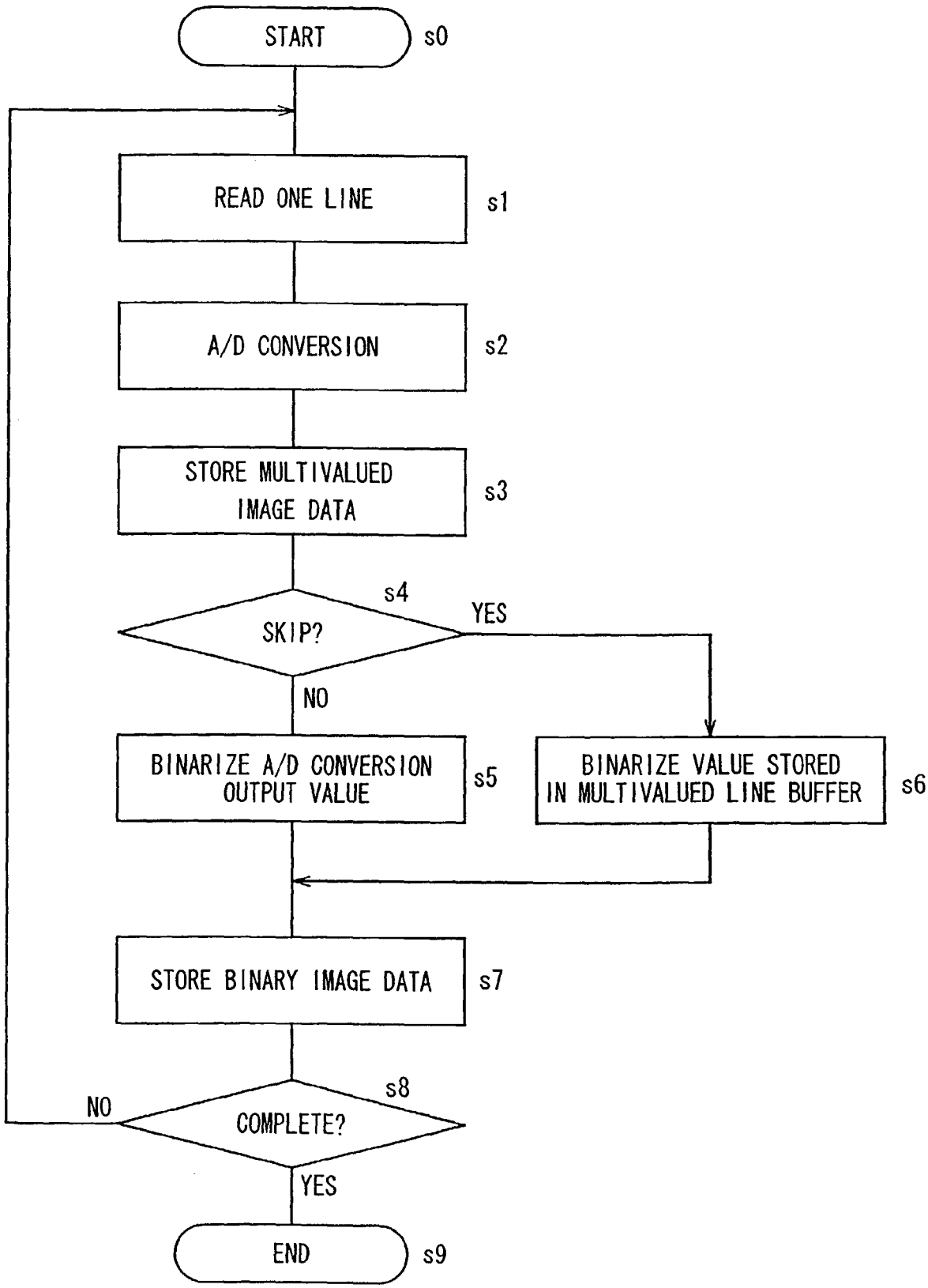
FIG. 3 is a flowchart showing a procedure through which the hand scanner image processing apparatus of FIG. 1 carries out processing.

FIG. 3 shows a processing procedure for binarizing image reading signals from the scanner in the scanner image processing apparatus of the embodiment. The processing is started at step s0, and image reading signals of one line are inputted at step s1. At step s2, the image reading signals are converted from analog signals to digital signals in the A/D conversion section 1. At step s3, multivalued image data of one line is stored in the multivalued image line buffer 2. At step s4, the skip acknowledgement section 3 detects a skip. When a skip is not detected, the multivalued image data of one line from the A/D conversion section 1 is inputted to the binarization processing section 5 and binarized at step s5.

When a skip is detected at step s4, for generation of interpolation binarized data, at step s6, the multivalued image data of one line stored in the multivalued image line buffer 2 is inputted in the binarization processing section 5 in which binarization processing as well as interpolation processing is carried out to generate interpolated and binarized data. When the binarization processing at step s5 or step s6 is completed, binary image data of one line is stored in the binary image memory 6 at step s7, and it is determined at step s8 whether reading is completed or not. When it is determined at step s8 that reading is not completed, the processing is returned to step s1 and continued. When it is determined at step s8 that reading is completed, the processing is ended at step s9.

Figure 4A:
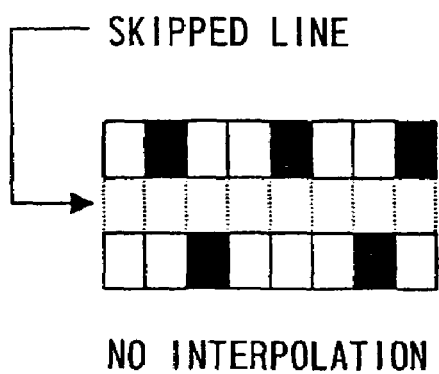
FIGS. 4A to 4C are views showing a comparison between an image with no interpolation and an image with interpolation.
Figure 4B:
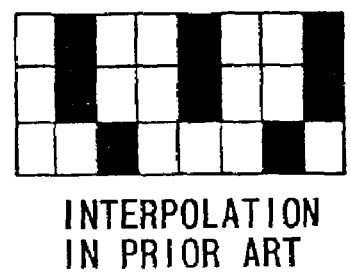
Figure 4C:
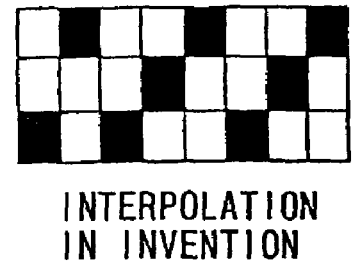

In FIGS. 4A to 4C, an effect of interpolation of the embodiment is shown in FIG. 4C in the manner of comparing with a case of no interpolation shown in FIG. 4A and a case of interpolation in the prior art shown in FIG. 4B. In the case of no interpolation shown in FIG. 4A, when a second line is skipped, image data in the second line between a first line and a third line drops out. In the case of interpolation in the prior art shown in FIG. 4B, image data of the first line is copied to the second line where data drops out, so that a cluster of black pixels of two lines is formed only at the interpolated part, and an image quality is deteriorated. As shown in FIG. 4C, in the case where interpolation of the second line is carried out by the error diffusion method in the embodiment, a cluster of pixels is not formed. It is because of an influence of the error diffusion method that data in the third line of FIG. 4C is different from those of FIGS. 4A and 4B. In other words, because of an influence of an error cropping up in binarization to interpolate the second line, the third line of FIG. 4C does not coincide with those of FIGS. 4A and 4B.

Although interpolation of a skip is carried out by using the invention for the processing of image signals read by the hand scanner in the above description, it is also possible to interpolate at each line and increase resolution in the sub-scanning direction. Moreover, not only by carrying out interpolation of image signals from a one-dimensional line sensor at each line, but also by carrying out interpolation of image signals outputted by one line from a two-dimensional CCD image sensor at each line, it is also possible to increase resolution.

In the invention, as long as the image processing apparatus comprises the A/D conversion section 1, the multivalued image line buffer 2 and the binarization processing section 5 in order to carry out the processing of generating, from analog image signals inputted for individual lines in the main scanning direction, binary image data in which the lines are sequentially arranged in the sub-scanning direction, it is possible to alternately carrying out binarization and interpolation, thereby increasing resolution in the sub-scanning direction and increasing smoothness of an oblique line. Since the multivalued image line buffer 2 is just required to store image data of one line, it is possible to make necessary storage capacity comparatively small.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus which carries out the processing of generating, from analog image signals inputted for individual lines in a main scanning direction, binary image data in which the lines are sequentially arranged in a sub-scanning direction, comprising:

analog/digital conversion means for converting analog image signals of each individual line to a plurality of predetermined bits of multivalued digital signals;

multivalued image storing means for storing one line of image data at a time, the multivalued image storing means being configured to store the multivalued digital signals of each individual line of image data obtained by conversion of the analog image signals of said each individual line by the analog/digital conversion means; and binarization processing means which is capable of binarization processing of image data of one line, said one line being obtained from one of the analog/digital conversion means and the multivalued image storing means, the multivalued digital signals of the one line of image data stored in the multivalued image storing means being used when interpolation processing between lines is performed.

2. The image processing apparatus of claim 1, wherein the analog image signals are image reading signals inputted by a hand scanner, the image processing apparatus further comprising skip detection means for detecting presence or absence of a skip, which is to skip reading of a line, from the image reading signals, wherein the binarization processing means carries out the binarization processing in a line in which a skip is not detected by the skip detection means and carries out the interpolation processing in a line in which a skip is detected.

3. The image processing apparatus of claim 1, wherein the binarization processing means is capable of carrying out the interpolation processing by switching a plurality of methods including fixed threshold value binarization and error diffusion binarization, the image processing apparatus further comprising key operation inputting means for switching between a character mode and a photo mode, wherein when the key operation inputting means is switched to the character mode, the binarization processing means carries out the interpolation processing by fixed threshold value binarization.

4. The image processing apparatus of claim 2, wherein the binarization processing means is capable of carrying out the interpolation processing by switching a plurality of methods including fixed threshold value binarization and error diffusion binarization, the image processing apparatus further comprising key operation inputting means for switching between a character mode and a photo mode, wherein when the key operation inputting means is switched to the character mode, the binarization processing means carries out the interpolation processing by fixed threshold value binarization.

5. An image processing method comprising the steps of:

inputting analog image signals of one line in a main scanning direction;

converting the inputted analog image signals to a plurality of predetermined bits of multivalued digital signals by analog/digital conversion means;

storing image data of one line represented by multivalued digital signals obtained by conversion of the analog image signals of one line by the analog/digital conversion means in multivalued image storing means;

detecting presence or absence of a skip in which reading a line is skipped, by skip detection means;

when a skip is not detected in the line, outputting the multivalued digital signals converted by the analog/digital conversion means to binarization processing means, and when a skip is detected in the line, outputting the image data represented by the multivalued digital signals stored in the multivalued image storing means, to the binarization processing means; and in the binarization processing means, when a skip is not detected in the line, carrying out binarization processing of the multivalued digital signals, and when a skip is detected in the line, carrying out binarization processing of the image data from the multivalued image storing means together with interpolation processing thereof.

* * * * *